Oct. 9, 1962 P. S. OSBORNE 3,057,335
PREINDUCTION MEANS AND METHOD FOR TREATING A FUEL AIR MIXTURE
Filed April 11, 1960 2 Sheets-Sheet 1
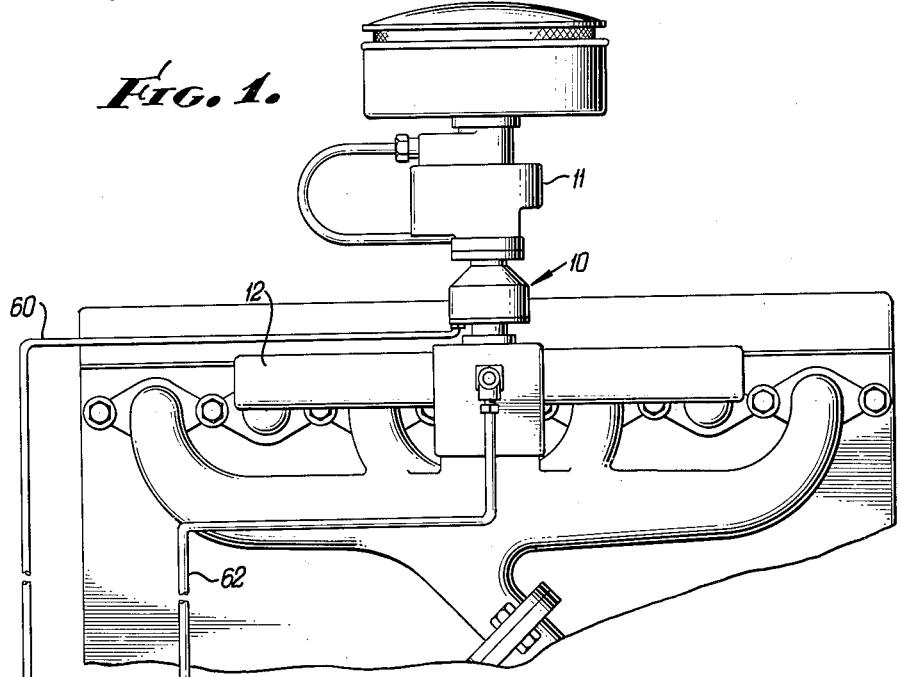
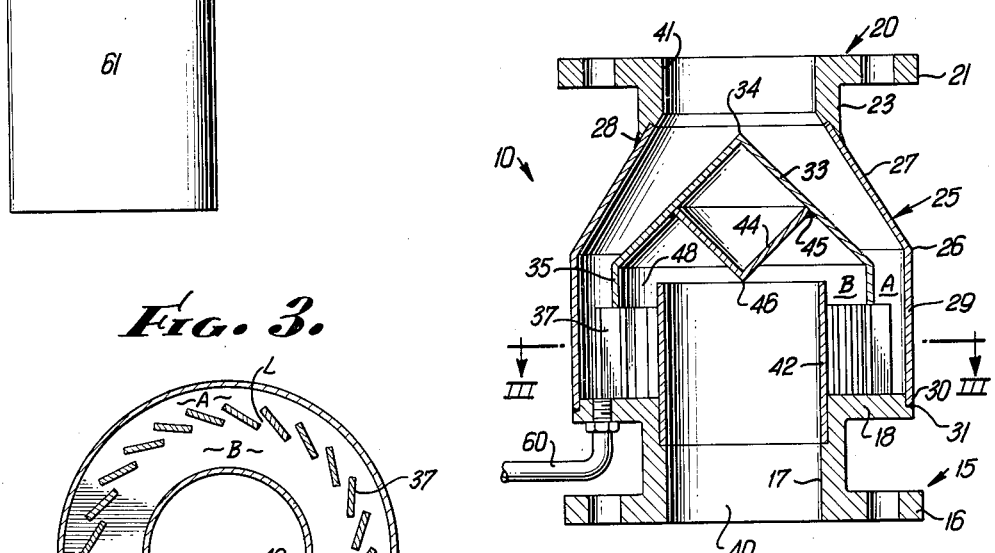
INVENTOR.
PHILLIP S. OSBORNE
BY
Miketta and Glenny
ATTORNEYS.

INVENTOR.
PHILLIP S. OSBORNE
BY
Miketta and Glenny
ATTORNEYS.

United States Patent Office 3,057,335
Patented Oct. 9, 1962

3,057,335
PREINDUCTION MEANS AND METHOD FOR TREATING A FUEL AIR MIXTURE
Philip S. Osborne, Los Angeles, Calif., assignor, by mesne assignments, to Osborne Associates, Los Angeles, Calif., a partnership
Filed Apr. 11, 1960, Ser. No. 21,258
23 Claims. (Cl. 123—119)

This invention relates generally to a means and method for separating miscible liquids on the basis of volatility and more particularly to a preinduction means and method for treating a fluid mixture to be introduced to a combustion engine to improve the performance of the engine by enhancing the combustion characteristics of the mixture during normal operation, idling, acceleration and deceleration whereby exhaust gases emitted from the engine are virtually free from carbon monoxide, unburned fuel particles and contain reduced quantities of oxides of nitrogen.

The invention contemplates a preinduction device for use between a carburetor and an intake manifold of an internal combustion engine which is effective to separate from the fluid mixture fuel particles or droplets such as those containing high carbon molecules or non-vaporizable fractions of a gasoline under those pressure differential conditions between the intake manifold and the carburetor which exist during all operating conditions including idling, acceleration and deceleration.

When an internal combustion engine is operated under conditions of idling, deceleration, or low running speeds, the position of the carburetor throttle valve is closed or almost closed and air flow through the carburetor is restricted. The air speed is so low and there is such a small amount of air passing through the carburetor that practically no vacuum develops in the venturi and the fuel nozzle at the venturi will not feed any fuel when the throttle valve is closed or only slightly opened. Usually an idling and low speed fuel circuit provides fuel through idling and low speed jets under this condition. Since the rate of introduction of fuel under these conditions is primarily a function of the differential pressure across the idle jets and the low speed jets and since pressure at the carburetor above the throttle valve is about atmospheric while pressure at the cylinders is at a minimum subatmospheric pressure, or a high vacuum, an excessively rich fluid mixture is fed to the cylinders because of this differential pressure and combustion thereof is incomplete. As a result the exhaust gas emitted from the tail pipe of the engine operating under the above described conditions includes a high concentration of carbon monoxide, unburned hydrocarbons, and other pollutants which impair health, irritate the senses, damage vegetation, and interfere with visibility.

Under conditions of high running speed or heavy engine loading, the throttle is nearly or fully open, the vacuum at the cylinders is low (near atmospheric) and the fuel is introduced into the carburetor circuit by means of high speed jets; again by differential pressure, but this time occurring in the venturi section of the carburetor. When the engine is operating under heavy load or at full throttle, the fluid mixture is generally about one pound fuel to 13 or 14 pounds of air. Under the conditions of usual carburetor pressure, excess air is present in the amount of approximately 20% by volume or approximately 4 to 5% excess oxygen. Although theoretically 1 to 14 to 1 to 16 is in the range of ideal combustion ratios resulting in stoichiometric mixtures, still the intimacy of the mixture produced by normal carburetion even at high speeds is such that there is still a production of carbon monoxide gas and a residue of uncombined oxygen. During the high temperature portion of the burning cycle, this uncombined oxygen has a strong tendency to combine with the nitrogen present in the atmosphere contained within the cylinder and as the production of nitric oxides is one wherein the combination can take place at high temperature and is stable at low temperature, the rapid cooling of the exhaust gases leaving the combustion chamber causes the production of rather large quantities of nitric oxide along with carbon monoxide because of the probable chemical combination at the temperatures involved that encourage the production of nitric oxide apparently over the production of carbon dioxide. In the usual carburetor, therefore, carbon monoxide and unburned hydrocarbons are produced at low and idling speeds while at intermediate, heavy load or high speeds there is the production of carbon monoxide and nitric oxide. To be sure, there is production of less carbon monoxide with ideal combustion or carburetion, but there is a definite increase in nitric oxide production with leaner mixtures at higher combustion temperatures.

Numerous prior proposed devices have attempted to modify the characteristics of the emitted exhaust gases from an internal combustion engine so as to reduce pollutants introduced into the atmosphere. Some of the prior proposed devices have been designed to treat the exhaust gas after leaving the engine and include afterburners, catalytic devices acting on the exhaust gases, and exhaust gas recycling devices wherein exhaust gas is introduced into the intake manifold to increase the pressure therein and to improve combustion. The present invention proposes to avoid such devices and to improve combustion during idling, deceleration as well as general operating conditions so that the exhaust gas needs little or no further treatment.

The present invention contemplates a preinduction device which so improves the operation of the engine during low speeds, idling and deceleration that the exhaust gases emitted from an engine equipped with the preinduction device of this invention, are virtually free from carbon monoxide and unburned fuel particles or components. Generally speaking, the preinduction device of the present invention improves normal operation with the use of a normal fuel mixture during high speed or heavy engine load conditions where the throttle is open or near fully open and where the pressure differential between the carburetor and the intake manifold is at a minimum. At high speed or open throttle operation the present invention provides a stoichiometric mixture of air and gasoline vapor, which has been so mixed and so thoroughly evaporated as to place effectively each molecule of gasoline adjacent to one of oxygen so that when the mass is ignited no gasoline vapor remains unsurrounded by oxygen or remains in existence as a droplet of which only the surface can be burned in the time duration of the power explosion. This invention, therefore, not only pretreats the mixture of gasoline and air at idle speeds or low speeds, but also enhances the intimate mixture of gasoline or gasified gasoline and air in a maximumly burnable ratio and under ideally intermixed conditions, even at high speeds. Under these conditions there is little competition between carbon and hydrogen atoms on one hand, and nitrogen atoms on the other, for the oxygen atoms present and supporting combustion. At high speeds, therefore, because of the intimacy of the mixture and because of the stoichiometric carbon-hydrogen-oxygen mixture, there is little chance of oxygen combination with the nitrogen always present in atmospheric gases, and under conditions of low pressure differential across the carburetor, as in the case of open throttle or high speed operation of the engine, the device operates as described above. However, when pressure differential increases as under conditions of closed throttle or near closed throttle conditions during idling, deceleration and low running speeds, the preinduction device of this invention is effective to separate from the fuel mixture those particles remaining liquid which would normally pass through the engine and be only partially burned or unburned. The fuel mixture thus introduced into the cylinders under increased pressure differential between the carburetor and the intake manifold contains only those particles of fuel which will be readily and completely burned.

A principal object of this invention is to disclose a device for the separation of miscible liquids on the basis of differential volatility wherein vaporized fluid is subject to repeated treatment to encourage a maximum differential volatility of the various miscible liquids present.

Another primary object of this invention is to disclose and provide a preinduction device for use between a carburetor and an intake manifold which will improve engine operation under all operating conditions and which will thereby eliminate from the exhaust gases, fuel particles or components which contribute to air pollution.

An object of this invention is to disclose and provide a preinduction device which treats the fuel mixture by a method based upon fuel particle size, evaporation rate, and the pressure and temperatures at which vaporization of the fuel takes place.

Another object of this invention is to disclose and provide a device whereby the fuel is vaporized and so intimately mixed with air as to result in a stoichiometric mixture and in complete combustion upon ignition in the engine combustion chamber or zone.

A more specific object of this invention is to disclose and provide a preinduction device wherein fuel fractions not readily subject to vaporization under conditions of increased pressure differential, reduced temperature and reduced air volume are separated from the fuel mixture ultimately introduced into the cylinders.

A still further object of the invention is to disclose and provide a preinduction device wherein fuel particles are subjected to centrifugal separation of those molecules containing a greater number of carbon atoms from the molecules containing lesser number of carbon atoms so that under conditions of high pressure differential only the vaporized fuel particles are mixed with air and fed to the intake manifold.

Generally speaking, a preinduction device embodying this invention may include a housing adapted to be easily mounted between the intake manifold and the carburetor and wherein an inlet passageway from the carburetor supplies a fuel mixture of air and gasoline to an annular plenum chamber having a somewhat greater area than the area of the inlet passageway. Concentrically arranged within the plenum chamber is an annular separating chamber which may be partially defined by an outlet passageway means, the separating chamber having a cross-sectional area greater than that of the plenum chamber. Between the plenum chamber and the separating chamber are provided a plurality of circumferentially arranged louver elements disposed at a preselected angle so that a rotary motion is imparted to the flow of fuel-air mixture between the plenum chamber and the separating chamber. In the separating chamber the rotary motion of the fuel mixture causes the heavier not readily vaporizable particles or droplets of fuel to be subjected to centrifugal force and these heavier droplets are either impinged against the louvers for further breaking up to facilitate vaporization or wet the internal surfaces of the louvers and flow downwardly to the bottom of the separating and plenum chambers where they may be drained from the device. Lighter vapors or gasified fuel fractions are drawn upwardly over the top edge of the outlet passageway means and are introduced into the intake manifold from the said outlet passageway means in a swirling fashion which further serves to intimately mix the fuel mixture.

It will be readily appreciated that although the above device is described in connection with the separation of non-volatile droplets of fuel in a carrier gas of air, the invention contemplates use of a fuel mixture including a gas carrier of argon, nitrogen, carbon dioxide, or air. Thus, a unique advantage of the present device is that it is not limited to the separation of volatile and non-volatile liquids of a particular sort, and may be employed to treat fuel mixtures under a wide variety of temperature, pressure, gas velocity, types of carrier gas, and carrier gas conditions.

A still further object of this invention is to disclose a preinduction device wherein the evaporation and vaporization of the fuel fractions tend to reduce the temperature of the fuel air mixture by absorbing the heat of vaporization therefrom, thus cooling the mass and facilitating the removal of those less volatile fractions by condensation and further offering the advantage of a lower molar volume of the fuel air mixture presented for treatment and allowing the introduction of a greater quantity of the fuel-air mixture to the combustion chamber.

Many other advantages will be apparent from the following description and the drawings, in which exemplary embodiments of this invention are illustrated.

In the drawings:

FIG. 1 is a fragmentary side elevation of an internal combustion engine provided with a preinduction device embodying this invention;

FIG. 2 is a sectional view of the preinduction device shown in FIG. 1, the section being taken in a vertical plane bisecting the device;

FIG. 3 is a transverse sectional view taken in the plane indicated by line III—III of FIG. 2;

Figure 5:
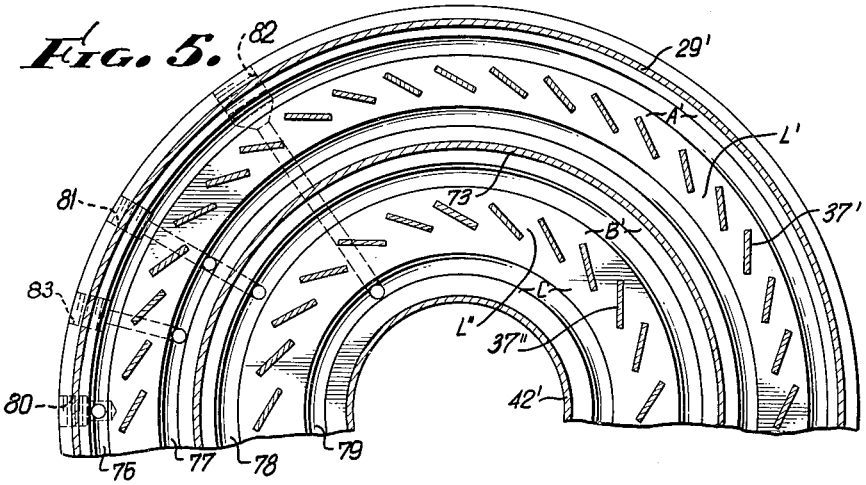
FIG. 5 is a transverse sectional view taken in the plane indicated by line V—V of FIG. 4.

While the present invention broadly contemplates separation of miscible liquids on the basis of differential volatility of components thereof, the example of the device and method hereafter described is directed to the treatment of fuel mixtures and it will be understood that fuel mixture may include kerosene, diesel fuels, alcohol, and other fuels adapted to be mixed with a selected carrier gas such as air to provide a mixture having selected characteristics. Fuel used in internal combustion engines and the like is considered as hexane and a usual air fuel mixture may be 12 or 13 pounds of air for one pound of fuel, which based on a stoichiometric mixture of 14.54 pounds of air for one pound of fuel, indicates a mixture somewhat rich in fuel fractions. It is generally assumed that a mixture near 12 to 13 pounds of air for one pound of fuel, will give the most complete combustion attainable, and it also is assumed that certain fractions of the carbon contained in the fuel does not burn to carbon dioxide, but more probably to carbon monoxide. The fuel for such mixture is usually a gasoline containing fuel fractions principally of pentanes, hexanes, heptanes, octanes, nonanes, decanes, and undecanes, and under full throttle conditions virtually all of these fractions are volatilized, intimately mixed with the air, and under present standards are considered to be substantially completely burned in the cylinders of the internal combustion engine. While fuel fractions have been referred to as pentanes, hexanes, etc., above for the purpose of nomenclature herein it will be understood that the actual fractions involved are probably not true members of the paraffin series but are compounds which have boiling points at or near the boiling point of the member of the paraffin series mentioned. Thus, more accurately the fuel fractions may be said to be hydrocarbonaceous compounds with boiling points in the ranges of the boiling points of the pentanes, hexanes, etc.

A preinduction device 10 embodying this invention, principally serves to provide stoichiometric gasoline and air mixture under virtually all conditions of operation, both idle, intermediate speed, and also at high speeds or open throttle operation conditions. Under open throttle, or high speed operation of the internal combustion engine, substantially all of the gasoline introduced by the carburetor is vaporized, intimately mixed, and presented to the combustion chamber as a mixture of optimum burnable properties. Under the condition of closed throttle, or near closed throttle, however, such as during idling, deceleration, and low running speeds, device 10 provides a very sharp separation or split between low carbon molecule highly vaporizable fractions of the fuel and high carbon molecule less vaporizable fractions of the fuel. Thus, the present device under idle conditions, for example, will pass to the intake manifold those fuel fractions including pentanes, hexanes, heptanes and some octanes while preventing passage and separating from the fuel mixture those fuel fractions including high boiling point octanes, nonanes, decanes and undecanes. Thus, non-vaporizable fuel fractions under idling conditions are not introduced to the cylinders of the engine and since these non-vaporizable fractions have been found by test to be present in the unburned fuel emitted by the exhaust gas it will be readily apparent that combustion of the fuel mixture under idling conditions is more complete and pollutants in the exhaust gas emitted have been substantially reduced. An example of a preinduction device having a construction capable of achieving this result is illustrated in the drawings.

The preinduction device 10 as shown in FIG. 1 may be installed between a carburetor 11 and an intake manifold 12 of an internal combustion engine. The carburetor 11 may be any well known carburetor adapted to mix atmospheric air with a selected quantity of fuel such as gasoline. The air fuel ratio should be selected very near to the stoichiometric mixture of the gasoline being burned. For instance, with hexane the air fuel ratio should be about 14½ to 1, so that at maximum speed operation or at full throttle operation the air fuel mixture will be optimum, while at low speed, or idle operation, the device herein described can remove less volatile fractions of the gasoline which at low speeds would normally contribute to the incompletely burned hydrocarbonaceous or unsaturated hydrocarbon pollution of the exhaust gases and consequently of the atmosphere in which the engine is operated. It will be noted that the preinduction device 10 may be of a size adapted to be readily fitted between a carburetor and the intake manifold and in this example the diameter of device 10 may be between three and one-half and five inches and the height between about three and one-half and five inches. The device 10 may include a base mounting member 15 having a bottom flange 16 adapted to provide a configuration suitable for connection to an intake manifold by suitable bolts in well known manner. The base member 15 may include a throat portion 17 defining an outlet passageway 40 and an upper flange 18 spaced from the bottom flange 16. A top member 20 coaxially aligned with the base member 15 may include a top flange 21 adapted to be connected to a bottom mounting flange 22 provided on the base of carburetor 11. Integral with flange 21 may be a short neck portion 23 defining inlet passageway 41 extending downwardly toward the base member 15.

A housing means 25 may interconnect the top and base members 20 and 15 and may comprise an outer wall 26 having a top frusto-conical wall portion 27 secured at its upper edge as by welding at 28 to the neck portion 23. The lower circumferential edge of wall portion 27 may be connected to the upper cylindrical edge of a cylindrical bottom wall portion 29 which may be seated in a recess 30 formed in the upper flange 18 of the base member 15 as by welding at 31.

Within the housing means 25 is a cone-shaped wall 33 having its apex 34 positioned on the axis of the device, directed toward the inlet passageway 41, and generally opposite the top edge of wall portion 27. The base of the cone-shaped wall 33 may be connected to an inner cylindrical wall portion 35 of short length which terminates in spaced relation to the top surface of the upper flange 18. Cylindrical wall portion 35 may be secured to the top edges of a plurality of circumaxially arranged louvre elements of rectangular section and in angular relation to each other. The lower ends of elements 37 may be secured by welding or soldering to the top surface of said upper flange 18.

Secured within outlet passageway 40 in a recess provided in said throat portion 17 may be a cylindrical outlet wall 42 which extends above the top of louver elements 37 and which terminates in spaced relation to a plane passing through the base of cone-shaped wall 33. Cone-shaped wall 33 may carry therewithin an inverted conical wall 42 secured thereto as by welding at 45 and having an apex 46 directed toward the outlet passageway 40 and located approximately in a plane common with the top edge of the outlet cylindrical wall 42.

The relationship between the cross sectional areas of the passageways and chambers formed by the exemplary structure described above, is particularly important. The outlet and inlet passageways 40 and 41 respectively may be of substantially the same cross sectional area. The conical wall portion 27 is formed with an included angle less than the included angle of the cone-shaped wall 33 and thus provides an angular tapered passageway of gradually progressively increasing cross sectional area. The outer wall portion 29 and the inner cylindrical wall 35 together with louver elements 37 define a plenum chamber A having a cross sectional area greater than the inlet passageway, and in this example the annular cross sectional area of plenum chamber A may be about 15% greater. The cylindrical outlet wall 42 may define with the cylindrical wall portion 35 and louvers 37 an inner separating chamber B concentric with the outlet passageway and plenum chamber A and provided with an annular cross sectional area about 45% greater than the cross sectional area of the inlet passageway 41.

The angularly related louver elements 37 provide communication between the plenum chamber A and the separating chamber B for a major portion of the height of said chambers, the tops of said louver elements 37 being spaced below the top edge of outlet wall 42. The louver elements 37 define a plurality of circumferentially spaced louver openings L the aggregate area of which in this example may be approximately 21% of the cross sectional area of the inlet passageway 41. The aggregate area of the openings L may be less than the cross sectional area of separation chamber B and greater than the cross sectional area of plenum chamber A. Thus, volume increments progressively increase from plenum chamber A to louver openings L and then an abrupt increase in voulme increment occurs in separation chamber B.

The relationship of the solid cylindrical wall portion 35 and the louver elements 37 which define the inner wall of the plenum chamber A together with the increase of only 6% between the aggregate area of openings L and the cross sectional area of plenum chamber A is such that under conditions of fuel-air mixture flow through plenum chamber A very little, if any, pressure differential exists between the top of the louver openings L and the bottom of said openings L. Thus, along the height of the louver elements pressure may be considered to be uniform.

The plane defined by one rectangular section louver element 37 may be disposed at approximately 15°, with respect to the plane of an adjacent louver element 37. Each louver element 37 may be disposed at an angle of sufficient magnitude to a radian extending from the axis of the outlet passageway 42 so that opposed convergent surfaces of adjacent louver elements 37 will impart a rotary motion to a fuel-air mixture passing through louver openings L and entering the separation chamber B. The fuel-air mixture is thus subjected to a motion component which moves the fuel-air mixture initially in a somewhat tangential slightly non-circular path around the outlet wall 42.

Annular top opening 48 of separation chamber B is spaced from the internal surface of cone-shaped wall 33 and provides communication between the separating chamber B and the outlet passageway 40. The converging surfaces of the cone-shaped wall 33 and the downwardly facing surfaces of the conical wall 44 together with the smoothly curved fillet surface provided by weld 45 serves to rapidly progressively decrease the cross-sectional area of the passageway provided between the opening 48 and the top opening of the outlet passageway 40 as defined by the top edge of outlet wall 42. Fuel-air mixture passing through opening 48 of the separating chamber is under the influence of the rotary motion force components imparted to it by the louver elements 37 and will retain such rotary motion as it is directed downwardly into the outlet passageway by the inverted cone 44. Fuel mixture passing through the outlet passageway 40 into the intake manifold will continue to rotate or swirl and further intimately mix the vaporizable fuel fractions with air.

Operation of the preinduction device 10 and the method by which performance of the engine is improved will now be described. A fuel-air mixture having characteristics previously mentioned is directed into inlet passageway 41 from the carburetor 11 and is annularly distributed to plenum chamber A while gradually increasing in volume and reducing its temperature. Because of the generally uniform pressure along the height of louver elements 37, the fuel-air mixture is uniformly passed through the plurality of louver openings L. The angular disposition of elements 37 imparts to the mixture a rotary motion which includes a centrifugal force component and a radially inwardly directed force component. These force components impose counter directed forces on fuel droplets of the mixture and in a sense provides a teetering column. The centrifugal force component urges the heavier droplets of fuel outwardly to cause their impingement against other louver elements 37 whereby such droplets may be diminished or broken up into smaller size until they may become vaporized in the separation chamber. Such heavier droplets which do not vaporize will wet the surfaces of louver elements 37 and eventually drain downwardly and collect as a liquid at the bottom of the separating chamber B, plenum chamber A and louver elements 37. The lighter fuel droplets which are thus separated by the centrifugal force component from the heavier droplets and which move inwardly and around the separating chamber B under the influence of the initially imparted radially inwardly directed force component will be intimately mixed with air in the separating chamber and as these lighter droplets are vaporized they move upwardly and then inwardly and over wall 42 and then downwardly in a swirling fashion through outlet passageway 40 to the intake manifold and the cylinders of the engine.

It is important to note that introduction of the mixture into the separating chamber B results in a sharp increase in expansion of the mixture because of the much greater cross-sectional area of the separation chamber as compared with the plenum chamber and that the temperature of the mixture is again reduced. Thus, the expansion and evaporation process to which the fuel mixture is subjected tends to reduce the temperature of the fuel-air mixture in device 10. Under pressure differential conditions present during idling or deceleration, as when the carburetor throttle is fully or near fully closed, the expanded cool fuel-air mixture in the separating chamber B is subject to high vacuum or low subatmospheric pressure from the engine cylinders. Thus a distillation process takes place under vacuum conditions which together with the centrifugal separation produces a separation of light hydrocarbon molecule vaporizable droplets, or low boiling point fuel fractions, from the heavier hydrocarbon molecule non-vaporizable droplets at such pressures and temperature.

Under pressure differential conditions during running speeds or full engine load, as when the throttle is fully open or near fully open, the expanded fuel mixture in the separation chamber is subjected to low engine vacuum and under such pressure and temperature conditions together with an abundance of air supplied through the fully open throttle, substantially all of the fuel droplets are intimately mixed with air in the separating chamber and are vaporizable through the range of the light and heavy hydrocarbon molecules present in the fuel mixture. Thus, in response to varying engine operating conditions which result in variable pressure differentials between the intake manifold and the carburetor the preinduction device of the present invention serves to separate non-burnable fuel components from burnable fuel components under such varying engine operating conditions.

As shown in FIG. 1 the separated residue of heavier fuel fractions of non-burnable fuel components may be collected at the bottom of the separating and plenum chambers and drained therefrom through a drain conduit 60 to a tank or reservoir 61. The tank may be vented as at 62 to the intake manifold as desired so that positive drainage of the residual fuel components will be provided. It will be understood that the tank may be vented by other well known means such as simply venting the same to atmosphere or to any chamber under equal or slightly lower pressure.

The residual fuel components collected in tank 61 may be disposed of in several ways depending upon the operating conditions of the engine. For example, if the engine is operated at full running speed most of the time the residual fuel components collected could be returned to the fuel tank associated with the engine since the accumulation of such residual fuel components would not be significant as will be later better understood. If the engine operates at slow speeds, long periods of idling and frequent deceleration, then the residual fuel components collected may be retained in tank 61 and disposed of periodically by draining therefrom during oil changes or refueling. The drained residual fuel components may be used for other suitable purposes where combustion conditions are satisfactory for proper burning thereof, or the residue resulting from normal operation of the engine both high and low speed operation, may be returned periodically to the fuel tank.

Means to return the residue to drain tank 61 may include a ball-check valve, vacuum check valve, or solenoid operated valve operable in such a manner as to drain storage tank 61 to the gasoline storage tank of the automobile during times of non-operation of the engine or during times when intake manifold pressures are at or very nearly atmospheric, depending upon the type of valve used, to permit intercommunication of the storage tank of the automobile and drain tank 61.

The utility of the present invention will be better understood by an analysis of products of combustion resulting from use of the preinduction device 10 on a test internal combustion engine using a premium grade gasoline. An initial analysis of the gasoline indicated a fractional distribution as follows.

|  | Percent |
|---|---|
| Pentanes | 15 |
| Hexanes | 20 |
| Heptanes | 25 |
| Octanes | 15 |
| Nonanes | 20 |
| Decanes and undecanes | 5 |

Fractional distribution of residual fuel components collected in a tank 61 under engine idling conditions was about as follows.

| | Percent |
|---|---|
| Octanes | 5 |
| Nonanes | 55 |
| Decanes | 30 |
| Undecanes | 10 |

The residual fuel components had a much higher initial boiling point as compared with the boiling point of the original gasoline and thereby indicates absence of lighter fuel fractions in the residue. From the distillation data provided above, it will be understood that the heavier fuel fractions or components were removed by the device 10 and the lighter more vaporizable fuel fractions including pentanes to octanes were burned.

The residual fuel components removed at high speed operation, however, were insignificant in volume amounting to one and one-half percent to a half a percent of the total gasoline consumed. Below are presented the fractional distribution of the burned fuel both at idle and 1600 r.p.m.

| | Percent of Total Gasoline | Percent of Burned Fraction | |
|---|---|---|---|
| | | Idle | 1,600 r.p.m. |
| Pentanes | 15 | 20 | 15 |
| Hexanes | 20 | 27 | 20 |
| Heptanes | 30 | 40 | 25 |
| Octanes | 10 | 13 | 15 |
| Nonanes | | | 21 |
| Decanes | | | 4 |
| Total | 75 | 100 | 100 |

By comparison of the fractional distribution of fuel under idling and running conditions it can be seen that under idling conditions relatively large amounts of non-vaporizable fuel fractions are collected and removed as a residue whereas under running speeds relatively few non-vaporizable fuel fractions are collected.

It has been found that the chemical analysis of the burned fractions under idle conditions is almost the same as hexane even though the fuel fraction actually burned was comprised of pentanes to octanes as indicated above.

Under idle conditions or 2000 r.p.m. no load conditions respectively an analysis of the products of combustion of the test engine using device 10 indicated the following components in the exhaust gas emitted therefrom.

*Idle Speeds*

| | | |
|---|---|---|
| Carbon dioxide | percent | 14.0 |
| Carbon monoxide | do | 0.0 |
| Oxygen | do | 1.0 |
| Unburned hydrocarbons | p.p.m. by volume | 111 |
| Ethylene | do | 70 |
| Acetylene | do | 24 |

*2000 R.P.M.*

Nitro-oxides ($NO_2$) _____ p.p.m. by volume__ 362

The Orsat method of analysis was used to determine the carbon dioxide, carbon monoxide and oxygen. The hydrocarbon components were determined by their infrared absorption. The amount of saturated unburned hydrocarbons was calculated using normal hexane as a basis and the oxides of nitrogen were determined by the phenoldisulphonic acid method.

It is important to note that the exhaust gas emission included zero carbon monoxide and only 111 p.p.m. of unburned hydrocarbons and 94 p.p.m. unsaturated hydrocarbons. It is considered that these components in exhaust gas emissions contribute most greatly to air pollution and in one area of the country the standards set for exhaust gas emissions for unburned hydrocarbons was 275 p.p.m. by volume as hexane and 1.5% by volume of carbon monoxide. It will thus be readily apparent that the exemplary preinduction device 10 of the present invention results in an exhaust gas emission which is free from carbon monoxide and in which unburned hydrocarbons are reduced to a minimum and are present to an extent far below that set as a standard.

Figure 4:
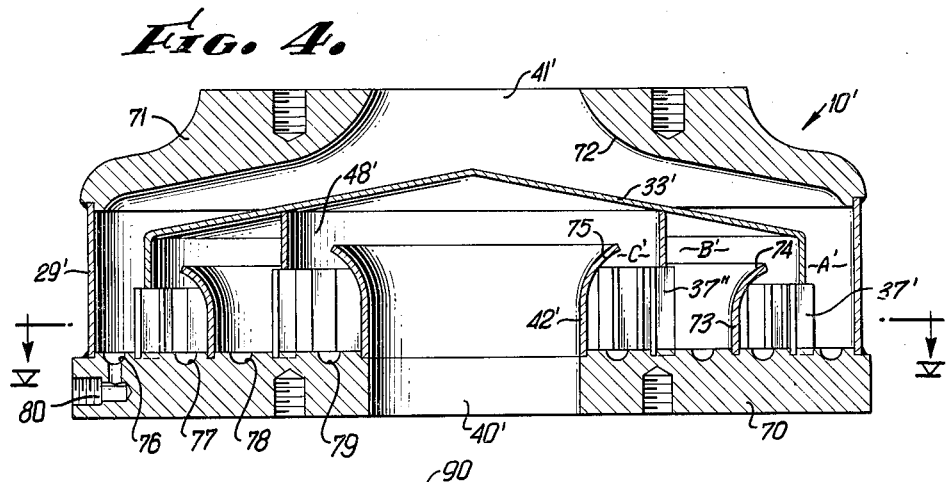
FIG. 4 is a sectional view of a modification of the device shown in FIG. 1, the section being taken in the same plane as FIG. 2.

In the modification of the preinduction device shown in FIGS. 4 and 5 only differences in construction will be described. Like parts will be indicated by reference numerals with a prime sign.

The preinduction device 10' is provided a construction which affords substantially less height than the device 10 of the prior embodiment and is more adaptable to the limited space requirements now present because of changes in vehicle body design. The device 10' may have a height of about two and one-half inches and may have an outer diameter of about six inches.

The device 10' may include a base member 70 of annular form and defining an outlet passageway 40'. A top member 71 may be cast or molded to a selected configuration as shown and may define inlet passageway 41' coaxial with the outlet 40'. A relatively shallow cone-shaped wall 33' is spaced below inlet 41' and from the internal surface 72 of the top member to define a passageway increasing gradually in volume for communication with outer annular plenum chamber A'. Chamber A' is defined by outer cylindrical wall 29' which interconnects circumferential opposed margins of the base member 70 and the top member 71.

A plurality of concentrically arranged separation chambers B' and C' are provided radially inwardly of the plenum chamber A'. Separation chamber B' is defined by a plurality of circumferentially spaced angularly inclined upstanding louver elements 37' which define a plurality of louver openings L'. Spaced radially inwardly from louver elements 37' is an annular wall 73 having a radially outwardly curved top edge portion 74 which defines an opening 48' with the cone-shaped wall 33' for flow of vaporized components of the fluid mixture into the radially inwardly spaced subplenum chamber of the separation chamber B'. Louver elements 37" spaced radially inwardly from wall 73 provide a plurality of louver openings L" which provide communication between the subplenum chamber of separation chamber B' and separation chamber C'. In this example, outlet passageway 40' is further defined by the cylindrical wall 42' having a radially outwardly curved or flared upper circumferential portion 75 which defines with the cone-shaped wall 33' and the louver elements 37" opening 48" for communication between separation chamber C' and the outlet passageway.

Means to collect non-volatilized fuel components from chambers A', B' and C' in this example include concentrically arranged grooves 76, 77, 78 and 79 formed in the top surface of the base member 70. Groove 76 is provided communication with drain 80 provided in base member 70, grooves 77 and 78 are provided intercommunication therebetween and are connected to a drain 81 spaced from drain 80, and groove 79 is provided communication with a drain 82 provided in spaced relation to drain 81. Thus, a plurality of drain outlets are provided in the edge face of the base member 70 and these drain outlets may be connected to either separate collecting tanks not shown or to a common collecting tank as indicated in the prior embodiment of this invention.

The method of operation of device 10' is similar to the method described above for the prior embodiment. A fluid mixture entering inlet passageway 41' from a carburetor or other supply of an air-fuel mixture is dispersed or distributed radially outwardly in gradually expanding volume to plenum chamber A. Rotary motion is imparted to the mixture as it passes through louver elements 37' and vaporizable components of said mixture are passed into the subplenum chamber of the separation chamber B' for further intermixing as they pass through louver elements 37" into the separation chamber C'. Non-vaporizable fractional components of the fluid mixtures in the separation chambers B' and C' are collected in the louvers 76-79 and are drained through drains 80, 81 and 82. The separation of the fuel fractions is dependent upon the pressure differential existing between inlet passageway 41' and outlet passageway 40' which leads to the intake manifold and cylinders of an exemplary combustion engine.

The relationship of the cross sectional areas of chambers A', B' and C' and the inlet and outlet passageways are not described in detail since they may include the relationships mentioned in the exemplary first embodiment of this invention described above but also may vary in their cross sectional area and volume relationship depending upon the type of fuel miscible liquid and carrier gas being treated by the separator device 10'. It will be understood that in some instances the cross sectional area and volume relationships may provide increasing expansion of the mixture or in some instances at certain points in the system may provide contraction of such volume conditions.

It should also be understood that when the term "fuel-air" or "air-fuel mixture" is used herein the mixture includes a carrier gas such as air or the other types mentioned hereinabove and the fuel includes gasoline, kerosene or other types of miscible liquids.

Figure 6:
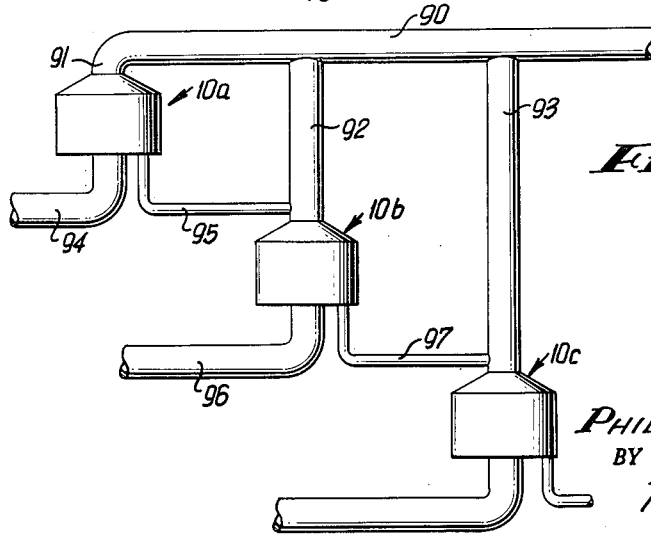
FIG. 6 is a diagrammatic view showing use of the separator device of this invention in an industrial installation.

In FIG. 6 is a schematic or diagrammatic illustration of an industrial installation for the purpose of separation of miscible liquids of different boiling points. In general, a carrier gas as defined above is passed through a header 90 and at selected spaced intervals the header may be connected in fluid communication with respective separating devices 10a, 10b and 10c through suitable conduits such as 91, 92 and 93. Each separating device 10a, 10b and 10c may include the structure described above with respect to FIG. 1 and FIG. 4. Volatilized fluid components at separator 10a may be conducted through outlet conduit means 94 to a suitable condenser or the like while non-volatilized fluid components may be drained from the device 10a through a drain conduit 95 for introduction into the separator device 10b at the inlet passageway thereof. The volatilized fluid components produced by the separation device 10b may be conducted through an outlet conduit 96 to a different condenser or other means while the non-volatilized fluid components may be conducted through drain 97 to the inlet passageway of the separator device 10c. The same process is performed on the fluid mixture introduced into the device 10c for separating the miscible fluid mixture fed thereto through conduit 93 and the drain 97. It will be readily apparent that by use of separator device 10 in such an arrangement separation of miscible liquids of various types may be accomplished and the specific relationship of the separating chambers in each of the devices may be different depending upon the type of fluid mixture and separation desired of the miscible liquids contained therein. It will also be apparent that the pressure differential between the inlet and outlet passageways in each of the devices 10a, 10b and 10c may be varied in order to produce selected desired results. It is also contemplated that the successive treatment of the non-volatile fractions may be extended beyond the number of treatments thereto as described above with respect to FIG. 6 and that they may be directed into a carrier gas stream and particularized and treated under different pressures, temperature and gas velocity conditions in other similar volatilizing devices such as 10.

It will be understood that the arrangement shown in FIG. 6 is adapted to treat a fuel mixture so as to remove objectionable fuel fractions in gasoline before it is sold and placed in the tank of a vehicle. In such pretreatment a neutral gas such as nitrogen or carbon dioxide may be used as a carrier. Such pretreatment would reduce the quantity of residual fractions extracted by a separator device on a combustion engine of a vehicle to a minimum.

With respect to disposition of residual fractions collected from a separator device associated with a combustion engine on a vehicle it is contemplated that the drain tank 61 may be provided with an electrically or solenoid operated inlet valve which would be normally closed during operation of the vehicle but when the vehicle was not in use and the ignition switch turned to off position the solenoid actuated valve would open so as to permit residual fractions to drain into the supply or fuel tank of the vehicle.

It will be understood by those skilled in the art that the device and method of the present invention provides a solution to an air pollution problem resulting from extensive use of vehicles having internal combustion engines and from which exhaust gas emissions normally include large amounts of unburned or partially oxidized fuel components when the engine is operating under conditions of idling, deceleration and slow speeds.

The device 10 of the present invention removes unburnable fuel components before they are introduced to the internal combustion engine. The device 10 not only improves engine performance by increasing the efficiency of the engine but also permits engine operation free from detonation, pinging, knocking and provides a slight increase in power.

There may be various modifications and changes made in the construction of the device 10 which illustrates an exemplary structure and method for improving the performance of an internal combustion engine and all such modifications and changes which come within the scope of the appended claims are embraced thereby.

I claim:

1. A device for improving the performance of an internal combustion engine having a carburetor and intake manifold comprising; means defining an intake passageway for receiving a fuel-air mixture from the carburetor; means providing an outer annular chamber in communication with said passageway for first receiving the fuel-air mixture; means providing an inner annular chamber concentric with said outer chamber; means directing flow of said mixture from said outer chamber to said inner chamber and for imparting rotary motion to said fuel-air mixture upon introduction thereof into said inner chamber for separating non-volatilized fuel droplets from said fuel-air mixture; and means providing an outlet passageway in communication with the upper portion of the inner chamber, said outlet passageway being in communication with the intake manifold.

2. A device as stated in claim 1 wherein said inlet and outlet passageways are of approximately the same cross-sectional area, said outer chamber having a cross-sectional area greater than said passageways and said inner chamber having a cross-sectional area greater than said outer chamber.

3. A device as stated in claim 1 wherein said means directing flow of said mixture and imparting rotary motion to the fuel-air mixture includes a plurality of circumferentially spaced circumaxially disposed angularly related louvre elements defining openings having an aggregate area greater than the cross-sectional area of said outer chamber and less than the cross-sectional area of the inner chamber.

4. A device as stated in claim 1 including a cone-shaped wall having its apex facing the inlet passageway and extending between the inlet passageway and the outer chamber.

5. A device as stated in claim 1 including an inverted conical wall having an apex facing said outlet passageway and serving to direct vaporized fuel fractions from said inner chamber into said outlet passageway.

6. A device as stated in claim 1 including means for collecting said non-volatilized fuel droplets.

7. A device as stated in claim 6 wherein said collecting means includes a drain conduit in communication with said inner chamber.

8. A device for improving the performance of an internal combustion engine having a carburetor and an intake manifold under conditions of idling, deceleration and low speeds comprising: means for receiving a fuel-air mixture from a carburetor under at least atmospheric pressure; means for increasing the volume of said received mixture and reducing the temperature thereof; means for further increasing the volume of said mixture and further decreasing the temperature thereof and imparting a rotary motion to said mixture whereby volatile fractions of said fuel are separated from non-volatile fractions of said fuel and subjecting said volatile fractions to sub-atmospheric pressure; and means for discharging only said volatile fractions into said intake manifold.

9. A device as stated in claim 8 including means for removing said non-volatile fractions from said device.

10. A device for use between a carburetor and intake manifold of a combustion engine and operable to separate non-vaporizable fractions from vaporizable fractions of a fluid mixture during conditions of idling, deceleration and operable at high speeds or open throttle operation to encourage complete mixing of the fuel and air fractions and complete volatilization of the fuel fraction comprising: a housing means having an inlet passageway, an annular outer plenum chamber having a cross sectional area greater than the cross sectional area of said inlet passageway, an annular inner chamber of cross sectional area greater than said outer chamber, and an outlet passageway communicating with said inner chamber; means between said outer and inner chambers for imparting rotary motion to flow of said fluid mixture upon entering said inner chamber whereby droplets of said fluid mixture are subjected to radially inwardly directed force components and to centrifugal force components, said vaporizable fractions of said fluid mixture being passed through said outlet passageways and said non-vaporizable fractions of said fluid mixture being collected and drained from said chambers.

11. A device as stated in claim 10 wherein said means between said outer and inner chambers includes a plurality of circumaxially arranged spaced louver elements providing openings for communication between said chambers.

12. A device as stated in claim 11 including conduit means for drainage of said non-vaporizable fractions from said chambers, said conduit means having an inlet adjacent the bottom of said louvers.

13. A device to separate non-vaporizable fractions from vaporizable fractions of a fluid mixture, comprising: a housing means having an inlet passageway, a plenum chamber in communication with said inlet passageway and having a cross-sectional area greater than the cross-sectional area of said inlet passageway, a separating chamber in communication with said plenum chamber and having a cross-sectional area equal to or greater than said plenum chamber, and an outlet passageway communicating with said separating chamber; and means between said plenum chamber and said separating chamber for imparting rotary motion to flow of said fluid mixture upon entering said separating chamber whereby droplets of said fluid mixture are subjected to counter-directed force components acting to separate vaporizable fractions from non-vaporizable fractions of said fluid mixture under conditions of pressure differential across said inlet and outlet passageways of said housing means.

14. A device as stated in claim 13 wherein said means for imparting rotary motion to said fluid mixture includes louver elements arranged in spaced angular relation and defining spaced openings therebetween.

15. A method of improving combustion at a combustion zone and utilizing a fuel containing hydrocarbonaceous compounds with boiling points in the range of the boiling points of pentanes through undecanes comprising the steps of: initially introducing said fuel into air to provide a fuel mixture and reducing the temperature thereof, imparting rotary motion to said mixture in a radially decreasing direction while expanding said mixture and further reducing the temperature thereof whereby the more volatile low carbon content molecule fractions of said mixture are volatilized and the higher carbon content molecule fractions of said mixture are non-volatilized and are separated from the mixture, and directing only said volatilized fractions to said zone.

16. A method as stated in claim 15 wherein said combustion zone is in an internal combustion engine and wherein under pressure differentials corresponding to idling and deceleration conditions of said engine the hydrocarbonaceous compounds volatilized have the general characteristics of hexane and include fuel fractions in the range of pentanes to and including some lower boiling point octanes.

17. A method as stated in claim 15 wherein under pressure differentials corresponding to normal running conditions of the engine the hydrocarbonaceous compounds volatilized include substantially all fuel fractions in the range of pentanes through undecanes.

18. A method of separation of fuel components of a fuel-air mixture supplied to an internal combustion-engine in response to varying operating conditions of the engine comprising the steps of: directing a fuel-air mixture along a selected path while gradually increasing the volume thereof, imparting a rotary motion to said mixture whereby fuel droplets are subjected to centrifugal force components and to radially inwardly directed force components, simultaneously, rapidly increasing the volume of said mixture and subjecting the same to subatmospheric pressure in relation to the operating condition of the engine, whereby fuel droplets are vaporized in accordance with the molecular weight thereof and with respect to the pressure and temperature imposed thereon by engine operating conditions.

19. A method of treating fluid mixtures including a carrier gas and a miscible liquid, the steps of: feeding a fluid mixture along a selected path; subjecting the fluid mixture to pressure differential while imparting rotary motion thereto to subject the fluid mixture to centrifugal force components and to radially inwardly directed force components for separating volatilized fractions from non-volatilized fractions of said fluid mixture; collecting said non-volatilized fractions; and directing said volatilized fractions along a different selected path.

20. A method of separation of miscible liquid fractions in a fluid mixture and responsive to selected pressure differentials, comprising the steps of: directing the fluid mixture along a selected path; imparting rotary radially inwardly circumaxially directed motion to said mixture to so completely intermix the mixture that a stoichiometric combination is provided in volatilized fractions of said mixture; and removing the non-volatilized fractions of said mixture from the presence of said fluid mixture along said selected path.

21. In an apparatus for separation of fuel fractions of a fluid mixture, comprising: means for directing the fluid mixture along a selected path while increasing the volume of said fluid mixture; means for imparting rotary motion to said fluid mixture whereby said fluid mixture is subjected to centrifugal force components and to radially inwardly directed force components; means for simultaneously subjecting said fluid mixture to subatmospheric pressure whereby fuel droplets are vaporized in accordance with the molecular weight thereof and with respect to the pressure and temperature imposed thereon; means for directing said vaporized fuel droplets along a selected path; and means for collecting and removing unvaporizable fuel droplets whereby only said vaporized fuel droplets move along said last-mentioned selected path.

22. An apparatus for treatment of fuel mixtures to separate selected fuel fractions therefrom in the presence of a carrier gas, the combination of: a housing means provided with an inlet passageway and an outlet passageway; means within said housing defining a plurality of chambers concentrically arranged about the axis of said inlet passageway and including outer and inner chambers, said outer chamber having direct communication with said inlet passageway and said inner chamber having communication with said outlet passageway; and means between said chambers for imparting rotary radially inwardly directed circumaxially related motion to said mixture for intermixing said mixture and separating vaporized fuel fractions from unvaporized fuel fractions.

23. In an apparatus for separation of miscible liquid fractions in a fluid mixture; the combination of: inlet passageway means for a fluid mixture; means providing a passageway of increasing volume for flow therethrough of the mixture introduced through said inlet passageway means; means providing concentric adjacent chambers of decreasing volume, the chamber having the largest volume being in direct communication with the passageway of increasing volume; means to impart radially inwardly directed rotational movement to the mixture entering said chamber of largest volume; and an outlet passageway means in direct communication with the chamber of smallest volume, whereby volatilized fractions of said mixture are passed through said outlet passageway means and said non-volatilized fractions of said mixture are separated from said volatilized fractions in said chambers of decreasing volume.

References Cited in the file of this patent

UNITED STATES PATENTS

| | | |
|---|---|---|
| 1,763,746 | Benkiser | June 17, 1930 |
| 2,057,165 | Schreurs | Oct. 13, 1936 |
| 2,072,353 | Ball | Mar. 2, 1937 |
| 2,351,494 | Wall | June 13, 1944 |